United States Patent [19]

Feeney et al.

[11] Patent Number: 4,774,099

[45] Date of Patent: Sep. 27, 1988

[54] PROCESS FOR MAKING BROWNIES CONTAINING CELLULOSIC FIBER

[75] Inventors: Robert D. Feeney, West Chester; Robert L. Prosise; Joseph McGrady, both of Cincinnati; Raymond L. Niehoff, West Chester; David A. Volker, Cincinnati, all of Ohio

[73] Assignee: The Procter & Gamble Company, Cincinnati, Ohio

[21] Appl. No.: 869,157

[22] Filed: May 30, 1986

[51] Int. Cl.$^4$ .............................................. A21D 10/00
[52] U.S. Cl. .................................... 426/552; 426/804
[58] Field of Search ................ 426/552, 553, 554, 555, 426/631, 849, 804

[56] References Cited

U.S. PATENT DOCUMENTS

| | | |
|---|---|---|
| 3,694,230 | 9/1972 | Cooke . |
| 3,982,003 | 9/1976 | Mitchell et al. . |
| 4,143,172 | 3/1979 | Mitchell et al. . |
| 4,225,628 | 9/1980 | Lynn . |
| 4,275,088 | 6/1981 | Hart et al. . |
| 4,304,768 | 12/1981 | Staub et al. . |
| 4,374,702 | 2/1983 | Turbak et al. . |
| 4,378,381 | 3/1983 | Turbak et al. . |
| 4,379,782 | 4/1983 | Staub et al. . |
| 4,431,681 | 2/1985 | Hegedus et al. . |
| 4,451,489 | 5/1984 | Beale et al. . |
| 4,451,490 | 5/1984 | Silverman et al. . |
| 4,456,626 | 6/1984 | Nelson et al. . |
| 4,481,077 | 11/1984 | Herrick . |
| 4,503,083 | 3/1985 | Glicksman et al. . |
| 4,526,794 | 7/1985 | Altomare et al. . |
| 4,526,799 | 7/1985 | Glicksman et al. . |

FOREIGN PATENT DOCUMENTS

| | | |
|---|---|---|
| 37209 | 10/1981 | European Pat. Off. . |
| 213587 | 1/1986 | German Democratic Rep. . |
| 57-54573 | 4/1982 | Japan . |

OTHER PUBLICATIONS

Kesterson et al., 1973 Food Technology Feb. issue p. 50.
Sinclair 1961 The Orange, Its biochemistry and physiology University of California, Division of Agricultural Sciences p. 195.
Formulation Guide, Bulletin G-54, FMC Corp. (undated).
Bulletin RC-53, FMC Corp. (Undated).
National Grain Products Co., Inc. pamphlet (undated).
Bradddock et al., "Carbohydrate Fiber from Orange Albedo", J. Food Sci. 46, 650 (1981).
Andres, "Natural Bulking Agents Provide Fiber and Desired Textures", Food Processing 42, #5, 66 (1981).
Hannigan, "Dried Citrus Juice Sacs Add Moisture to Food Products", Food Engineering, 54, #3, 88 (1982).

Primary Examiner—Donald E. Czaja
Assistant Examiner—Carolyn Paden
Attorney, Agent, or Firm—Ronald L. Hemingway; Gary M. Sutter; Richard C. Witte

[57] ABSTRACT

The present invention relates to improved baked goods, and in particular brownies, which contain an absorbent edible fiber. Improvements have been noted in the areas of chocolate flavor display, texture, tolerance to underbaking, height and moisture retention. The baked goods are made from a mix which comprises from about 0.1% to about 10% cellulosic fiber, from about 45% to about 65% sugar, from about 15% to about 35% flour, from about 3% to about 18% shortening, from about 0% to about 12% cocoa, and from about 0% to about 4% starch, the balance being conventional baked good additives. The finished baked goods comprise from about 68% to about 93% of the mix, from about 0.5% to about 6% egg solids, from about 0% to about 16% oil, and from about 5% to about 20% water.

42 Claims, No Drawings

PROCESS FOR MAKING BROWNIES CONTAINING CELLULOSIC FIBER

TECHNICAL FIELD

The field of this invention is baked goods having from 5% to 20% moisture, and mixes and batters for preparing them. In particular, this invention relates to brownies having improved flavor, texture, height, and moisture retention.

BACKGROUND OF THE INVENTION

Typical brownies tend to dry out quickly and become tough and hard. They also tend to form a dense, fudgy bottom layer and a drier upper layer. This results in a decrease in height. The chocolate flavor impression of brownies is sometimes lacking as well. Hence, there is a need for improvements in brownies in these areas.

Several references disclose baked goods made with fiber or bulking agents. For example, U.S. Pat. No. 4,503,083 to Glicksman et al. describes a dry cake mix comprising 10-50% flour, 0-45% sugar, 2-12% shortening, 0-20% egg white solids, 1-12% leavening agent, 0-4% emulsifier, 1-20% bulking agent and 0-10% gum. The preferred bulking agents are citrus albedo, sugar beet pulp, and pineapple core. The cake mix is combined with from 0.6 to 2.5 parts by weight water for each 1 part cake mix and baked to produce a low-calorie cake containing less than 2 calories per gram and 40% or more water on an as-consumed basis.

Similarly, U.S. Pat. No. 4,431,681 to Hegedus et al. discloses a process for preparing a 40% or greater calorie-reduced cake containing a moisture content of 40% or more. The process involves preparing a batter formulation comprising 40-65% water, 5-30% cake flour, 0-25% sugar, 1-6% shortening, 0-10% egg white solids, 0.5-6% of a leavening agent, 0-2% of an emulsifier and 1-20% of a water binder which is either a gum, bulking agent or combination; adjusting the batter viscosity within the range of from 15,000 to 30,000 cps. as measured by a Brookfield Viscometer; and baking at a temperature of from 300°-450° F. (149°-232° C.) for a time sufficient to produce a bake loss of moisture of from 5-20%.

Cakes differ from brownies and other baked goods with 5% to 20% moisture in several respects, including the levels of shortening and water, the uniformity of distribution of the water, and the ratio of sugar to flour. The references do not address the problems of moisture retention, height, and chocolate flavor intensity.

It is therefore an object of the present invention to produce brownies which retain their moisture and moisture density longer, are taller, are more tolerant to underbaking, and are better tasting than standard brownies.

It is another object of this invention to provide these improvements by incorporating a cellulosic fiber into the brownies.

It is a further object of this invention to make improved brownie-like baked goods having from 5% to 20% moisture, e.g. bar cookies and chewy granola or snack bars.

These and other objects of the invention will become clear by the disclosure herein.

All percentages are by weight unless othewise defined.

SUMMARY OF THE INVENTION

The present invention relates to improved baked goods, and in particular brownies, which contain an absorbent cellulosic fiber. Improvements occur in the areas of chocolate flavor display, texture, tolerance to underbaking, height and moisture retention. The baked goods are made from a mix which comprises from about 0.1% to about 10% cellulosic fiber, from bout 45% to about 65% sugar, from about 15% to about 35% flour, from about 3% to about 18% shortening, from about 0% to about 12% cocoa, and from about 0% to about 4% starch, the balance being conventional additives. The finished baked goods comprise from about 68% to about 93% of the mix, from about 0.5% to about 6% egg solids, from about 0% to about 16% oil, and from about 5% to about 20% water.

DETAILED DESCRIPTION OF THE INVENTION

This invention involves the discovery of novel dry mixes and batters for improved baked goods, and in particular for brownies having improved flavor, texture, height, and tolerance, and extended moisture retention. The baked goods are made with an absorbent cellulosic fiber, preferably prepared from citrus whole peel or citrus albedo. The brownies exhibit a more intense chocolate flavor and a fster chocolate flavor display. They have a desirably moist and tender texture with a rapid mouthmelt. They also have increased height and an improved ability to retain their moisture over time. This improved moisture retention reduces staling in the brownies, helping to keep them tender. Additional benefits of this invention are a shorter required baking time, as a result of improved baking tolerance, and fewer eggs needed in the batter.

The development of this invention applies to baked goods having a final moisture content between about 5% and about 20%. While the invention is specifically described in terms of improved brownies, other baked goods within the scope of this invention include bar cookies and chewy granola or snack bars. Brownies include both chocolate-flavored brownies and vanilla-flavored brownies, also known as "blondies". When blondies are made, vanilla is substituted for cocoa in the dry mix. These vanilla-flavored brownies usually contain added chocolate chips or butterscotch or other flavored chips.

The dry mix of the present invention comprises the following ingredients by weight: from about 0.1% to about 10% cellulosic fiber, from about 45% to about 65% sugar, from about 15% to about 35% flour, from about 3% to about 18% shortening, from about 0% to about 12% cocoa, and from about 0% to about 4% starch, the balance being conventional baked good additives. Preferably the mix comprises from about 0.2% to about 4% cellulosic fiber. Chocolate brownies generally will contain from about 2% to about 12% cocoa.

By "cellulosic fiber", as used herein, is meant a dietary fiber comprised of at least about 20% cellulose or modified cellulosic material (for example, carboxymethyl cellulose). the fiber can contain other fibrous components, such as hemicelluloses, pectins, and lignin. Sources of the cellulosic fiber include vegetables, fruits, seeds, cereals, and man-made fibers (for example, by bacterial synthesis). Commercial fibers such as purified plant cellulose, or cellulose flour, can also be used.

Preferably, the fiber is selected from whole citrus peel fiber or citrus albedo fiber, or other naturally occurring fibers that contain a composition similar to citrus peel fiber, for example sugar beets, citrus pulp and vesicle solids, apples, apricots, and watermelon rinds. Most preferred are citrus whole peel, citrus albedo, and sugar beet pulp. Mixtures of the above can also be used. These fibers can be processed by methods known to the art. When these materials are used as the fiber, the dry mix comprises from about 0.1% to about 4% fiber, and preferably from about 0.2% to about 2%. When the fiber is a modified cellulose, the dry mix preferably comprises at leat about 0.75% fiber.

The fiber must have an absorbency between about 2 grams water/gram fiber and about 25 grams water/gram fiber. Preferably, the fiber will have an absorbency between about 8 grams water/gram fiber and about 15 grams water/gram fiber. A high absorbency is preferred for providing the benefits of this invention.

For purposes of this invention, absorbency is measured by the following procedure. A standard heat-sealed tea bag is used, made with tea bag filter paper, Dexter Grade 1234 Tea, and measuring 3" by 2-7/16". One-half gram of fiber is placed into an empty tea bag. The bag is immersed for 2 minutes in distilled water at room temperature, then removed and hung in the air, and allowed to drip dry for 10 minutes. The bag is then weighed. The procedure is repeated using an empty tea bag without fiber. The weight of the bag alone is subtracted from the weight of the bag containing fiber. This number is divided by the weight of the sample, to obtain an absorbency value measured as grams water/grams fiber.

The fiber must also have a particle size such that at least about 80% of the fiber particles have a diameter less than about 300 microns, and preferably less than about 200 microns. Larger particles are detected as being gritty during mastication and are objectionable. Smaller particles are easier to disperse in the product.

The amount of fiber used will be dependent on its absorbency. One skilled in the art will recognize this and adjust the formulation for the water absorbency of the fiber. For fiber that absorbs around 11.5 grams water per gram of fiber, preferably from about 0.2% to about 2.5% fiber is used. As a general rule, the amount of fiber used (not to exceed 10%) will preferably be (0.2%–2.5%) X, where $$X = \left[ \frac{11.5 \text{ g. } H_2O/g. \text{ fiber}}{\text{fiber absorbency}} \right]$$

Ordinary granulated sugars are satisfactory for use in the dry mix. These include sucrose, dextrose, maltose, fructose, lactose, brown and invert sugars, alone or in combination. The preferred sugar is sucrose. Powdered sugars can also be used. The ratio of sugar to flour should be in the range of about 0.9:1 to about 1.7:1, preferably from about 1:1 to about 1.6:1.

The flour of the dry mix can be bleached cake flour, although a general-purpose flour can be substituted. Flours which have been treated in other manners to produce flours of the quality of bleached cake flour are also acceptable. Flour can be enriched with additional vitamins and minerals. Protein flours, such as soy flour, and synthetic flours can also be used herein.

The fats or oils suitable for use as the shortening herein can be plastic or fluid; however, a major portion of the shortening can be derived from naturally occurring liquid triglyceride oils such as cottonseed oil, soybean oil, peanut oil, rapeseed oil, sesame oil, coconut oil, corn oil, and sunflower seed oil. Also suitable are the liquid oil fractions obtained from palm oil, lard and tallow, as for example by graining or directed interesterification, followed by separation of the oils. Those predominating in glycerides of unsaturated fatty acids may require some hydrogenation to maintain flavor. Fish oils such as herring, menhaden and whale oil can also be used herein.

Mixtures of the above oils can also be used herein as can solid fatty materials, such as saturated triglyceride fats. In general, from about 1.5% to about 25% of triglycerides which are solid at 70° F. can be added to a liquid oil.

The preferred oils are soybean oil hydrogenated to an iodine value (IV) of from about 105 to 115, preferably about 107, corn oil, palm oil, hydrogenated palm oil, lard and tallow oils. Preferably the oils used to prepare the shortening composition will contain only from about 1% to about 7% hardstock. Hardstock is a hydrogenated triglyceride having an iodine value of 8 or less. Preferred hardstocks are hydrogenated soybean oil, hydrogenated cottonseed oil, hydrogenated palm oil and hydrogenated lard or tallow.

Preferably, the shortening will contain an emulsifier which comprises from about 3% to about 30% of the shortening system. Suitable emulsifiers are lactylated mono- and diglycerides, propylene glycol monoesters, polyglycerol esters, sorbitan esters, diacetylated tartaric acid esters of mono- and diglycerides, citric acid esters of monoglycerides, stearoyl-2-lactylates, polysorbates, succinylated monoglycerides, acetylated monoglycerides, ethoxylated monoglycerides, lecithin, sucrose monoester, and mixtures thereof.

Polyglycerol esters suitable for use in the present invention have an average of from 2 to 10 glycerol units and from 1 to 3 fatty acyl groups of from 14 to 18 carbon atoms per glycerol moiety.

A preferred shortening/emulsifier system is that disclosed in U.S. Pat. No. 4,456,626 to Nelson et al., issued June 26, 1984. The shortening contains an emulsifier consisting essentially of a hydrophilic polyglycerol monoester and a propylene glycol monoester, wherein the fatty acids used to esterify the polyglycerol ester and propylene glycol esters have from about $C_{16}$–$C_{22}$ carbon atoms, the ratio of propylene glycol monoester to polyglycerol ester being from 2:1 to 7:1. The remainder of the shortening system is fats, oils or hydrogenated fats and oils.

The cocoa used in this invention is either natural or "Dutched" chocolate from which a substantial portion of the fat or cocoa butter has been expressed or removed by solvent extraction, by pressing, or by other means. Cocoa suitable for use in the process of this invention may contain from 1% to 30% fatty constituents.

Dutched chocolate is prepared by treating cocoa nibs with an alkali material such as potassium carbonate in a manner well known in the art. Generally, it tends to have a darker color and also can be more flavorful than natural cocoas.

Chocolate can be used in practicing the process of this invention and it is intended, therefore, that chocolate, as described above, is to be encompassed by the term "cocoa." When chocolate is used, it should be in a finely divided form. It may be necessary to reduce the amount of shortening in the mix when chocolate is used because of the additional fat present as cocoa butter. It may also be necessary to add larger amounts of chocolate as compared to cocoa in order to provide an equivalent amount of flavoring and coloring.

The starch used can be any of the common food starches, for example, potato starch, corn starch, wheat starch, rice starch, barley starch, oat starch, tapioca starch, arrowroot, and sago starch. Modified starches and pregelatinized starches can also be used.

The term "conventional additives" includes ingredients such as leavening agents, flavors, colors, nutrients, antioxidants, and antimicrobial agents. The leavening can comprise a baking soda, for example sodium, potassium, or ammonium bicarbonate, and a baking acid, preferably sodium aluminum phosphate, monocalcium phosphate and dicalcium phosphate or mixtures thereof. Alternatively, a small amount of baking soda can be used alone. The selection of the leavening system is within the skill of one in the art. Flavor chips, nuts, fruit pieces, or other edible inclusions may be added to the brownies. Flavor chips include chocolate, mint chocolate, butterscotch, and peanut butter chips.

To achieve the benefits of the instant invention, it is preferred that the cellulosic fiber be processed in one of two ways. First, the fiber can be prehydrated before being mixed with the remaining ingredients to form a batter. Prehydration is discussed below in detail.

Second, at least about 50% of the fiber can be co-milled in a multi-impact mill with at least about 25% of the sugar of the dry mix, before being added along with the remaining sugar to the other dry mix ingredients. The cellulosic fiber and sugar are co-milled using a multi-phase impact mill which employs an internal particle size classifier to return oversize materials for further grinding, or which subjects the material to be treated to repeated grinding actions in several internal stages. These multi-pass impact mills involve a substantial co-action between particles of material being treated.

A detailed description of the co-milling process is in commonly assigned U.S. Pat. No. 3,694,230, issued to Cooke, Sept. 26, 1972.

After the sugar and cellulosic fiber are co-milled, they are mixed together in a conventional manner with the other dry mix ingredients. Preferably, however, shortening containing an emulsifier is first mixed with the co-milled sugar/fiber mixture to form an essentially homogenous blend. Then the additional dry mix ingredients are admixed with this blend.

The other preferred method of processing the fiber is to prehydrate it before adding it to the other dry mix ingredients to form a batter. The fiber can be prehydrated by the addition of the water to be added to the batter. Alternatively, the fiber can be prehydrated in an intermediate moisture medium. The fiber/medium can either be contained as a separate package from the mix or sprayed onto the dry mix ingredients; the amount of fiber/medium sprayed can be from about 10% to 20% by weight of the mix.

By "intermediate moisture medium" as used herein is meant a liquid having a high dissolved solids content, such as a syrup having a solids content between about 50% and 90%. The portion of the intermediate moisture medium not comprising solids will comprise water. The solids can be sugars or other ingredients that are edible and compatible with baked goods. Examples of intermediate moisture media include corn syrup, liquid sugar, invert sugar syrup, honey, malt syrup, molasses, sorghum syrup and maple syrup. Corn syrup is an aqueous solution of a mixture of sugars such as fructose, dextrose, maltose, higher sugars and dextrins. Sucrose can also be added to it. Preferred intermediate moisture media are corn syrup, invert sugar syrup, sorbitol, xylitol, polydextrose, and glycerine. Most preferred are corn syrup and invert sugar syrup, and mixtures thereof.

The medium must be shelf stable and in a condition such that microbial growth is inhibited. The intermediate moisture medium should have a water activity between about 0.55 and about 0.75, and preferably between about 0.60 and about 0.70. Higher $a_w$'s are allowable if a suitable antimicrobial agent and pH adjustment is employed.

By "prehydrated" is meant that the cellulosic fiber is mixed with the intermediate moisture medium so that the medium substantially hydrates the fiber. The ratio of medium to fiber necessary for hydration depends on the solids content of the medium and the absorbency of the fiber. When corn syrup (solids content of about 70%) is used to prehydrate a fiber with absorbency of between about 10–15 ml water/g fiber, the ratio of corn syrup to fiber needed for complete hydration is at least about 10:1.

The amount of intermediate moisture medium in the baked good as measured on a dry solids basis comprises from about 10% to about 75% of the baked good's sugar, and preferably from about 10% to about 30%. Since the medium normally contains both water and sugar, the amounts of sugar in the baked good and water added to the batter are reduced accordingly. For example, if 40 grams of corn syrup is added to the baked good, and if the corn syrup has a solids content of 70%, the amount of sugar added to the baked good is reduced by 28 grams (40 g×0.70), and the amount of water added to the baked good is reduced by 12 grams (40 g×0.30).

Full prehydration generally takes between about 5 minutes and about 15 minutes, depending on the types of fiber and intermediate moisture medium used.

Prehydration of co-milling of the cellulosic fiber are preferred because these processes control fiber hydration, aid in uniformly dispersing the fiber throughout the baked good, and are more convenient for preparation of the batter. Co-milling also reduces the fiber particle size and forms an intimate mixture with the sugar. This aids in hydration and dispersibility of the fiber.

To prepare a batter, the dry mix described above is combined with egg solids, oil and water. The batter comprises, by weight, from about 65% to about 88% of the dry mix, from about 0.5% to about 6% eg solids, from about 0% to about 15% oil, and from about 10% to about 25% water. Preferably, the batter comprises from about 68% to about 85% of the dry mix, from about 1% to about 4% egg solids, from about 2% to about 10% oil, and from about 12% to about 22% water.

When an intermediate moisture medium is used to prehydrate the fiber, the batter comprises from about 33% to about 86% of the dry mix, from about 3% to about 40% intermediate moisture medium, from about 0.5% to about 6% egg solids, from about 0% to about 15% oil, and from about 0% to about 24% water. Preferably, the batter comprises from about 56% to about 83% of the dry mix, from about 3% to about 17% intermediate moisture medium, from about 1% to about 4% egg solids, from about 2% to about 10% oil, and from about 7% to about 21% water.

The normal method for incorporating egg solids into the batter will be by the addition of whole eggs. On the average, an egg contains about 73% water and about 27% egg solids. The egg solids comprise about 13.3% protein, about 11.5% fat, and about 2.2% minor materials. Typically, one or two normal-sized whole eggs are added to the batter of this invention.

Instead of adding eggs to the dry mix to form the batter, it is understood that the inclusion of egg solids, in particular egg albumin and dried yolk, in the mix are allowable alternatives. Soy isolates, whey protein concentrates, and other egg substitutes may be used in the place of egg solids.

The amount of egg solids used depends on the type of brownie to be made. Fewer egg solids produce a flatter, more chewy brownie. More egg solids produce a taller, more cake-like brownie. Additional water also produces a taller, more cake-like brownie.

The batter ingredients are mixed together in a conventional manner to make a homogenous blend, for example, in a planetary bowl mixer, a ribbon blender, or in other conventional mixers.

The batter is baked in a conventional oven at temperatures of from about 325° F. to about 375° F. until done. Baking time depends on the thickness of the batter in the pan, with a longer bake time required for a thicker (higher) batter. Bake times range between about 16 minutes and about 32 minutes. For a preferred, chewy brownie, bake times are between about 18 minutes and about 25 minutes. For a more cake-like brownie, a longer bake time is used, generally longer than 27 minutes.

The product of this invention, then, is a baked good comprising from about 68% to about 93% of the dry mix discussed above; from about 0.5% to about 6% egg solids; from about 0% to about 16% oil; and from about 5% to about 20% water. Preferably, the baked good comprises from about 72% to about 91% of the dry mix, from about 1% to about 4% egg solids, from about 2% to about 12% oil, and from about 6% to about 18% water.

When an intermediate moisture medium is used to prehydrate the fiber, the finished baked good comprises from about 40% to about 90% of the dry mix, from about 4% to about 42% intermediate moisture medium, from about 0.5% to about 7% egg solids, from about 0% to about 17% oil, and from about 0% to about 19% water. Preferably, the baked good comprises from about 44% to about 88% of the dry mix, from about 4% to about 19% intermediate moisture medium, from about 1.5% to about 5% egg solids, from about 3% to about 12% oil, and from about 0% to about 17% water.

The cellulosic fiber used in this invention is absorbent and is able to hold excess water, and distribute it relatively uniformly in the structure of the brownie in which it is incorporated. When the dry mix of this invention is made into a batter, approximately 25-55% more water can be incorporated into the batter than is called for by a standard mix. Without this absorbent ability, addition of increased water to the batter would produce a gummy, runny or wet dense texture in the finished brownie. The instant cellulosic fiber enables a firm moist brownie crumb that is not gummy or wet and dense.

The absorbent nature of the fiber provides a related advantage in the form of extended moisture retention. Most brownies tend to lose moisture to the air and dry out and become hard and tough too quickly. The present brownies, due to the absorbency of the fiber, have an increased ability to retain moisture longer. This ability, plus the increased moisture content of the brownies, results in over a two-fold increase in the length of time that the brownies remain desirably moist. Increased moisture retention gives improved anti-staling properties to the brownies.

Another advantage provided by this invention is up to about a 15% increase in height in the brownies. Usually the height increase is between about 8% and about 12%. This increase in height, like the longer moisture retention, is related to the absorbency of the cellulosic fiber and the tenacity with which the fiber holds water. In standard brownies a thick, fudgy layer generally appears in the bottom half of the finished product. This is attributed to either a structure collapse or a lack of structure formation, thought to be caused by a rapid water loss in the upper half of the brownie. This drier upper region then imposes an inhibiting action on further moisture diffusion, essentially locking moisture below it. The highly moist, fudgy layer on the bottom is caused by this entrapment of moisture. The presence of the cellulosic fiber in the instant invention retards the top portion moisture loss by tightly holding the water, enabling structure formation more uniformly throughout the bulk of the brownie. The additional structure formed through incorporation of the fiber into the brownie, to uniformly distribute the water during baking, is thought to explain the height increase phenomenon. This invention produces a taller brownie, with moisture more uniformly distributed throughout the brownie.

Standard brownies receive most of their structure from the protein incorporated therein, mostly in the form of eggs or egg white solids. Surprisingly, the cellulosic fiber of the instant invention permits less protein to be used in the instant brownie, while still retaining a good structure and texture. This means, for example, that one less egg can be used in preparing the brownie batter. With a standard dry mix (23.6-ounce size), for a regular brownie two eggs are added to the dry mix and for a taller, more cake-like brownie three eggs are added to the dry mix in preparing the batter. With the use of the instant cellulosic fiber, only one egg is now required in the batter for a regular brownie, and only two eggs are used for a taller brownie. Hence, the structural contribution of protein in the brownie is reduced.

Use of citrus whole peel or citrus albedo in the present invention produces a surprising benefit in the form of increased tolerance to underbaking. The brownies can be baked for a shorter time than standard brownies while still producing a good texture. For example, a standard commercial dry brownie mix in the 23.6-ounce size, with ⅓ cup oil, ⅓ cup water, and 2 eggs added, uses a bake time at 350° F. of 28-33 min. when baked in a 13"×9" pan. A comparable batter prepared according to the present invention, by contrast, would use a bake time at 350° F. of only about 22-25 min. with a 13"×9" pan. This shorter bake time results in less water being driven off during the baking. The combination of baking for a shorter time and incorporating more water into the batter which is held in the dispersed absorbent fiber results in an increased moisture content in the finished brownies. Hence, the brownies exhibit a desirably moist texture, increased tenderness, and a rapid mouthmelt.

The shorter bake time has the additional benefits of decreasing the amount of protein denaturation in the brownie, and the energy consumption during baking. The decrease in protein content and in protein denaturation are thought to play important roles in an unexpected flavor benefit arising in the brownie of this invention. Expert flavor panelists were asked to taste the brownie of the present invention and to compare it to the taste of a brownie made from a commercial mix. Surprisingly, the present brownie was described as having a more intense chocolate flavor with a faster rate of flavor display. This desirable increase in chocolate flavor intensity and display occurred even though the two mixes contained an equal amount of the same type of cocoa. The intense chocolate flavor has also been found to be longer lasting than the chocolate flavor of most brownies. While not intending to be bound by theory, it is believed that less reliance on protein for the brownie structure and less protein denaturation due to a shorter bake time are involved in the production of this intense chocolate flavor. Cocoa has an affinity for hydrated protein such as that in an egg. It is thought that the cocoa in a brownie better adheres to the protein. When the brownie is baked, it is thought that the cocoa becomes trapped inside the protein-continuous crumb matrix of the brownie. Hence, not all the cocoa is available to produce a flavor as it is trapped within the brownie crumb. By contrast, the lower amount of protein used and the decrease in protein denaturation in the brownies of this invention means that cocoa is more available to provide flavor when the brownies are eaten. The presence of this additional available cocoa is thought to be involved in the perception of a more intense chocolate flavor.

The following examples are intended to be further illustrative of the present invention, but not limiting thereof.

EXAMPLE 1

Two groups of brownies are made combining the following ingredients:

| Ingredient | Amount (gms) |
|---|---|
| Sugar | 309.8 g |
| Flour | 152 g |
| Vegetable Shortening | 50 g |
| Cocoa | 35.3 g |
| Starch | 11.7 g |
| Conventional additives | 6.2 g |
| Eggs | 50 g |
| Oil | 73 g |
| Water | 80 g |

In addition to the above ingredients, the first group of brownies (six batches) contains 2.5 grams of orange albedo fiber. The second group, consisting of five batches, contains no added fiber.

The conventional additives include mostly flavors and a small amount of baking soda.

The orange albedo fiber has been water washed and ground to a particle size less than 300 microns. The fiber's water-holding capacity is 11.5 g water/g fiber. The fiber is first prehydrated for 10 minutes in the 80 grams of water. Then it is added to the other dry mix ingredients along with the eggs and oil.

The ingredients are stirred with a large spoon until well blended (about 50 strokes or 1 minute) to form a batter. The batter is poured into a lightly greased 13"×9"×2" pan, and then baked at 350° F. for 26.5 minutes to produce the finished brownies.

The brownies are measured for height. The first group, containing the orange albedo fiber, has an average height of 0.56 inches. The second group, without added fiber, has an average height of 0.49 inches. This demonstrates that the present invention produces brownies with increased height.

EXAMPLE 2

Two groups of brownie samples are made as in Example 1, except that the first group of brownies contains 5 grams of orange albedo fiber instead of 2.5 grams, and both groups contain 101 grams of water instead of 80 grams. Additionally, the brownies are baked at 350° F. for only 18 minutes instead of 26.5 minutes.

The resultant brownies in the first group, which contains the orange albedo fiber, have a tender mixture, a high chocolate flavor, rapid mouthmelt, and a height of 0.59 inches. By contrast, the brownies of the second group, without the fiber, are wet, soggy, and undone, and have a height of only 0.48 inches.

This example demonstrates that the brownies of the present invention containing orange albedo fiber have an increased tolerance to underbaking. This tolerance permits a shorter bake time, which results in a more intense chocolate flavor and more water retained in the brownies for increased moistness, in addition to retaining a tall brownie height. The fiber of the brownies permits added water to be incorporated into the brownie crumb. When regular brownies, without fiber, are underbaked, they turn out wet, soggy, and undone. The height of the brownies without fiber also decreases.

EXAMPLE 3

Two groups of brownies are made as in Example 1, except that 101 grams of water is added instead of 80 grams, and the brownies are baked at 350° F. for only 22 minutes instead of 26.5 minutes. The brownies made with orange albedo fiber have an intense chocolate flavor, and they are very moist and tender. Their average height is 0.64 inches. The brownies without fiber are not as moist or chocolatey, and their height is only 0.58 inches.

What is claimed is:

1. A method for preparing a dry mix for baked goods selected from a group consisting of brownies, bar cookies, and chewy granola or snack bars, having a final moisture content of about 5% to about 20%, the mix comprising:
   (i) from about 0.1% to about 10% cellulosic fiber having an absorbency between about 2 g water/g fiber and about 25 g water/g fiber;
   (ii) from about 45% to about 65% sugar;
   (iii) from about 15% to about 35% flour;
   (iv) from about 3% to about 18% shortening;
   (v) from about 0% to about 12% cocoa;
   (vi) from about 0% to about 4% starch;
   (vii) the balance being conventional additives selected from the group consisting of leavening agents, flavors, colors, nutrients, antioxidants, antimicrobial agents, flavor chips, nuts, fruit pieces, and mixtures thereof;
   said method comprising:
   (a) passing at least about 50% of the cellulosic fiber and at least about 25% of the sugar through a multi-impact mill to form a co-milled mixture, said mill causing a size reduction and co-action of the sugar and fiber particles by impact of particles with hard surfaces and/or with each other without the use of metal to metal contact or liquid suspensions; and then (b) admixing the remaining dry mix ingredients with the co-milled sugar and fiber.

2. A method according to claim 1 wherein the dry mix comprises from about 0.2% to about 4% cellulosic fiber.

3. A method according to claim 1 wherein the cellulosic fiber of the dry mix is selected from the group consisting of citrus whole peel fiber, citrus albedo fiber, sugar beet pulp, citrus pulp and vesicle solids, apples, apricots, and watermelon rinds, and mixtures thereof.

4. A method according to claim 3 wherein the cellulosic fiber of the dry mix is selected from the group consisting of citrus whole peel fiber, citrus albedo fiber, sugar beet pulp, and mixtures thereof.

5. A method according to claim 3 wherein the dry mix comprises from about 0.1% to about 4% fiber.

6. A method according to claim 5 wherein the dry mix comprises from about 0.2% to about 2% fiber.

7. A method according to claim 1 wherein the cellulosic fiber of the dry mix has an absorbency between about 8 g water/g fiber and about 15 g water/g fiber.

8. A method according to claim 1 wherein the baked goods comprise brownies and the dry mix comprises from about 2% to about 12% cocoa.

9. A method according to claim 1 wherein the cellulosic fiber of the dry mix has a particle size such that at least about 80% of the fiber particles have a diameter less than about 300 microns.

10. A method according to claim 1 wherein at least about 50% of the fiber has been co-milled in a multi-impact mill with at least about 25% of the sugar and wherein the product comprises combined fiber-sugar particles along with size-reduced fiber particles.

11. A method for preparing a batter for baked goods having a moisture content of about 5% to about 20%, the method comprising:

(a) first making a dry mix comprising:
  (i) from about 0.1% to about 10% cellulosic fiber having an absorbency between about 2 g water/g fiber and about 25 g water/g fiber;
  (ii) from about 45% to about 65% sugar;
  (iii) from about 15% to about 35% flour;
  (iv) from about 3% to about 18% shortening;
  (v) from about 0% to about 12% cocoa;
  (vi) from about 0% to about 4% starch;
  (vii) the balance being conventional additives selected from the group consisting of leavening agents, flavors, colors, nutrients, antioxidants, antimicrobial agents, flavor chips, nuts, fruit pieces, and mixtures thereof;
by passing at least about 50% of the cellulosic fiber and at least about 25% of the sugar through a multi-impact mill to form a co-milled mixture, said mill causing a size reduction and co-action of the sugar and fiber particles by impact of particles with hard surfaces and/or with each other without the use of metal to metal contact or liquid suspensions; and next admixing the remaining dry mix ingredients with the co-milled sugar and fiber; and then (b) combining from about 65% to about 88% of the resulting dry mix of (a) with
  (i) from about 0.5% to about 6% egg solids;
  (ii) from about 0% to about 15% oil; and
  (iii) from about 10% to about 25% water.

12. A method according to claim 11 wherein the dry mix of Step (a) consists of about 0.2% to about 4% cellulosic fiber.

13. A method according to claim 11 wherein the cellulosic fiber of Step (a)(i) is selected from the group consisting of citrus whole peel fiber, citrus albedo fiber, sugar beet pulp, citrus pulp and vesicle solids, apples, apricots, and watermelon rinds, and mixtures thereof.

14. A method according to claim 13 wherein the cellulosic fiber of Step (a)(i) is selected from the group consisting of citrus whole peel fiber, citrus albedo fiber, sugar beet pulp, and mixtures thereof.

15. A method according to claim 13 wherein the dry mix of Step (a) consists of from about 0.2% to about 4% fiber.

16. A method according to claim 15 wherein the dry mix of Step (a) consists of from about 0.2% to about 2% fiber.

17. A method according to claim 11 wherein the cellulosic fiber of Step (a)(i) has an absorbency of about 8 g water/g fiber and about 15 g water/g fiber.

18. A method according to claim 11 wherein the baked goods comprise brownies and the dry mix of Step (a) comprises from about 2% to about 12% cocoa.

19. A method according to claim 11 wherein the cellulosic fiber of Step (a)(i) has a particle size such that at least about 80% of the fiber particles have a diameter less than about 300 microns.

20. A method according to claim 11 wherein at least about 50% of the fiber of Step (a)(i) has been co-milled in a multi-impact mill with at least about 25% of the sugar in Step (a)(ii), and wherein the product comprises combined fiber-sugar particles along with size-reduced fiber particles.

21. A method according to claim 11 wherein from about 68% to about 85% of the dry mix of Step (a) is mixed with
  (i) from about 1% to about 4% egg solids;
  (ii) from about 2% to about 10% oil; and
  (iii) from about 12% to about 22% water.

22. A method for preparing a batter for baked goods having a moisture content of about 5% to about 20%, the method comprising:

(a) first prehydrating from about 0.1% to about 10% cellulosic fiber having an absorbency between about 2 g water/g fiber and about 25 g water/g fiber with from about 10% to about 25% water; and then (b) making a dry mix comprising:
  (i) from about 45% to about 65% sugar;
  (ii) from about 15% to about 35% flour;
  (iii) from about 3% to about 18% shortening;
  (iv) from about 0% to about 12% cocoa;
  (v) from about 0% to about 4% starch;
  (vi) the balance being conventional additives selected from the group consisting of leavening agents, flavors, colors, nutrients, antioxidants, antimicrobial agents, flavor chips, nuts, fruit pieces, and mixtures thereof; and then (c) mixing the prehydrated fiber of Step (a) with from about 65% to about 88% of the dry mix of Step (b) with
  (i) from about 0.5% to about 6% egg solids; and
  (ii) from about 0% to about 15% oil.

23. A method according to claim 22 where in Step (a) from about 0.2% to about 4% cellulosic fiber is prehydrated with from about 10% to about 25% water.

24. A method according to claim 22 wherein the cellulosic fiber of Step (a) is selected from the group consisting of citrus whole peel fiber, citrus albedo fiber, sugar beet pulp, citrus pulp and vesicle solids, apples, apricots, and watermelon rinds, and mixtures thereof.

25. A method according to claim 24 wherein the cellulosic fiber of Step (a) is selected from the group consisting of citrus whole peel fiber, citrus albedo fiber, sugar beet pulp, and mixtures thereof.

26. A method according to claim 24 where in Step (a) from about 0.1% to about 4% fiber is prehydrated with from about 10% to about 25% water.

27. A method according to claim 26 where in Step (a) from about 0.2% to about 2% fiber is prehydrated with from about 10% to about 25% water.

28. A method according to claim 22 wherein the cellulosic fiber of Step (a) has an absorbency of about 8 g water/g fiber and about 15 g water/g fiber.

29. A method according to claim 23 wherein the baked goods comprise brownies and the dry mix of Step (b) comprises from about 2% to about 12% cocoa.

30. A method according to claim 23 wherein the cellulosic fiber of Step (a) has a particle size such that at least about 80% of the fiber particles have a diameter less than about 300 microns.

31. A method according to claim 22 wherein the fiber of Step (a) is prehydrated with from about 12% to about 22% water and is then mixed with
  (i) from about 68% to about 85% of the dry mix of Step (b);
  (ii) from about 1% to about 4% egg solids; and
  (iii) from about 2% to about 10% oil.

32. A method for preparing a batter for baked goods having a moisture content of about 5% to about 20%, the method comprising:
  (a) first prehydrating from about 0.1% to about 10% cellulosic fiber having an absorbency between 2 g water/g fiber and about 25 g water/g fiber with from about 3% to about 40% of an intermediate moisture medium;
  (b) making a dry mix comprising:
    (i) from about 45% to about 65% sugar;
    (ii) from about 15% to about 35% flour;
    (iii) from about 3% to about 18% shortening;
    (iv) from about 0% to about 12% cocoa;
    (v) from about 0% to about 4% starch;
    (vi) the balance being conventional additives selected from the group consisting of leavening agents, flavors, colors, nutrients, antioxidants, antimicrobial agents, flavor chips, nuts, fruit pieces, and mixtures thereof; and then
  (c) mixing the prehydrated fiber of Step (a) with from about 33% to about 86% of the dry mix of Step (b) and with
    (i) from about 0.5% to about 6% egg solids;
    (ii) from about 0% to about 15% oil;
    (iii) from about 0% to about 24% water.

33. A method according to claim 32 where in Step (a) from about 0.2% to about 4% cellulosic fiber is prehydrated with from about 3% to about 40% of an intermediate moisture medium.

34. A method according to claim 32 wherein the cellulosic fiber of Step (a) is selected from the group consisting of citrus whole peel fiber, citrus albedo fiber, sugar beet pulp, citrus pulp and vesicle solids, apples, apricots, and watermelon rinds, and mixtures thereof.

35. A method according to claim 34 wherein the cellulosic fiber is selected from the group consisting of citrus whole peel fiber, citrus albedo fiber, sugar beet pulp, and mixtures thereof.

36. A method according to claim 34 where in Step (a) from about 0.1% to about 4.0% cellulosic fiber is prehydrated with from about 3% to about 40% of an intermediate moisture medium.

37. A method according to claim 36 where in Step (a) from about 0.2% to about 2% cellulosic fiber is prehydrated with from about 3% to about 40% of an intermediate moisture medium.

38. A method according to claim 32 wherein the cellulosic fiber of Step (a) has an absorbency of about 8 g water/g fiber and about 15 g water/g fiber.

39. A method according to claim 32 wherein the baked goods comprise brownies and the dry mix of Step (b) comprises from about 2% to about 12% cocoa.

40. A method according to claim 32 wherein the cellulosic fiber of Step (a) has a particle size such that at least about 80% of the fiber particles have a diameter of less than about 300 microns.

41. A method according to claim 32 wherein the intermediate moisture medium of Step (a) is selected from the group consisting of corn syrup and invert sugar syrup, and mixtures thereof.

42. A method according to claim 32 wherein the fiber of Step (a) is prehydrated with from about 3% to about 17% intermediate moisture medium and is then mixed with
  (i) from about 56% to about 83% of the dry mix of Step (b);
  (ii) from about 1% to about 4% egg solids;
  (iii) from about 2% to about 10% oil; and
  (iv) from about 7% to about 21% water.

* * * * *

UNITED STATES PATENT AND TRADEMARK OFFICE
CERTIFICATE OF CORRECTION

PATENT NO.  : 4,774,099

DATED       : September 27, 1988

INVENTOR(S) : Robert D. Feeney, et al

It is certified that error appears in the above-identified patent and that said Letters Patent is hereby corrected as shown below:

Column 2, line 28:  "fster" should read --faster--

Column 2, line 63:  "the" should read --The--

Column 6, line 54:  "eg" should read --egg--

Column 13, line 22:  "23" should read --22--

Column 13, line 25:  "23" should read --22--

Signed and Sealed this

Twenty-fifth Day of September, 1990

Attest:

HARRY F. MANBECK, JR.

*Attesting Officer*      *Commissioner of Patents and Trademarks*